(12) United States Patent
Brooks et al.

(10) Patent No.: US 11,977,620 B2
(45) Date of Patent: May 7, 2024

(54) ATTESTATION OF APPLICATION IDENTITY FOR INTER-APP COMMUNICATIONS

(71) Applicant: VMware, Inc., Palo Alto, CA (US)

(72) Inventors: Simon Paul Brooks, Napa, CA (US); Anuj Panwar, Atlanta, GA (US); Siavash James Joorabchian Hawkins, Canterbury (GB)

(73) Assignee: VMware LLC, Palo Alto, CA (US)

( * ) Notice: Subject to any disclaimer, the term of this patent is extended or adjusted under 35 U.S.C. 154(b) by 297 days.

(21) Appl. No.: 17/648,362

(22) Filed: Jan. 19, 2022

(65) Prior Publication Data
US 2023/0229752 A1     Jul. 20, 2023

(51) Int. Cl.
*H04L 29/06*     (2006.01)
*G06F 21/44*     (2013.01)
*H04L 9/40*     (2022.01)
*H04L 67/60*     (2022.01)

(52) U.S. Cl.
CPC .......... *G06F 21/44* (2013.01); *H04L 63/0823* (2013.01); *H04L 67/60* (2022.05)

(58) Field of Classification Search
None
See application file for complete search history.

(56) References Cited

U.S. PATENT DOCUMENTS

| | | | |
|---|---|---|---|
| 9,455,979 B2 * | 9/2016 | Blanke | G06F 21/42 |
| 2015/0264021 A1 * | 9/2015 | Schulz | H04L 63/0414 |
| | | | 713/170 |
| 2019/0074979 A1 * | 3/2019 | Xu | H04L 9/3247 |
| 2020/0159966 A1 * | 5/2020 | Sibert | H04L 9/3263 |
| 2020/0228333 A1 * | 7/2020 | Shockley | H04L 9/3242 |
| 2023/0131060 A1 * | 4/2023 | Ko | H04L 9/3263 |
| | | | 713/151 |

\* cited by examiner

*Primary Examiner* — Maung T Lwin
(74) *Attorney, Agent, or Firm* — Kim & Stewart LLP (57) ABSTRACT

Examples for validating the identify of an application in an inter-app communication protocol are described. An attestation payload is obtained from a third party attestation service that is executed remotely from a device on which the application is running. The attestation payload can be validated by another application on the device in order to validate the identity of the application providing the attestation payload.

20 Claims, 4 Drawing Sheets

FIG. 4

ATTESTATION OF APPLICATION IDENTITY FOR INTER-APP COMMUNICATIONS

BACKGROUND

With the emergence of mobile devices in enterprise environments, administrators of an enterprise technology infrastructure face constantly changing security threats to the mobile devices of their users. Mobile application developers often offer multiple applications that can be separately installed by administrators or users on user devices. These applications can utilize inter-app communication protocols to communicate data with one another.

In some situations, applications on a device may have a need to communicate potentially sensitive information, such as authentication credentials, enterprise data, personal information, and other data. As an example threat vector, a malicious application might spoof an inter-application, or inter-app, communication protocol established between applications to obtain, steal, or extract sensitive information from an application. Accordingly, applications communicating on a device require a mechanism to validate one another.

In some operating systems, a validated application identifier, such a bundle identifier, is provided that can only be obtained from the operating system. Accordingly, applications could rely on the bundle identifier to validate the identity of another application with which the application is communicating. However, in other operating systems, or in updates to existing operating systems, a validated application identifier is not provided. Therefore, a mechanism to validate applications that also fits within the limitations and protocols provided by operating system platforms can be useful for applications to validate respective identifies for information security purposes.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to providing a mechanism by which applications can validate the identity of other applications with which they are communicating using an inter-app communication protocol. For example, in the APPLE IOS operating system, certain versions of the operating system provided a validated application identifier, sometimes referred to as a bundle identifier, that applications could use to validate one another. The bundle identifier was provided by the operating system and validated in a way that applications could trust that the bundle identifier was legitimate. Accordingly, applications could validate the identity of another application by verifying that the bundle identifier matches one of an expected bundle identifiers.

For example, an application developer might release multiple applications that can communicate with one another. For example, the developer might release a single sign-on (SSO) application as well as an email client. The user can authenticate his or her identity using the SSO application and then utilize the email client to access enterprise email. The email client can request a credential from the SSO application that is associated with the user's identity so that the user is not required to separately authenticate his or her identity to the email client. The SSO application can provide an authentication token that the email client can in turn provide to an email server executed remotely from the device. Accordingly, utilizing inter-app communication in such a manner exposes potentially sensitive information.

A malicious application can potentially spoof the inter-app communication protocol and obtain an authentication token from the SSO application, thereby putting at risk potentially sensitive information, such as the user's email. Therefore, examples of this disclosure provide a mechanism whereby a receiving application, such as the SSO application, that receives a request for information from a sending application, can validate the identity of the sending application.

Examples of the disclosure can rely upon an attestation service that is executed remotely from a client device. The attestation service is provided by an operating system platform vendor and is intended to assist application developers with verifying network communications from applications on a device. However, examples of this disclosure employ a novel approach by utilizing the attestation service to verify and secure on-device communications, or inter-app communications. Examples of the attestation service can include the App Attest service provided as a part of the IOS platform.

Examples of the disclosure can request an attestation payload from a remotely executed attestation service. The attestation payload can be generated by the attestation service and provided to a requesting application. The requesting application can then provide the attestation payload to a receiving application as a part of an inter-app communication protocol. The receiving application can validate the identity of the application providing the attestation payload by validating the attestation payload as described herein.

Figure 1:
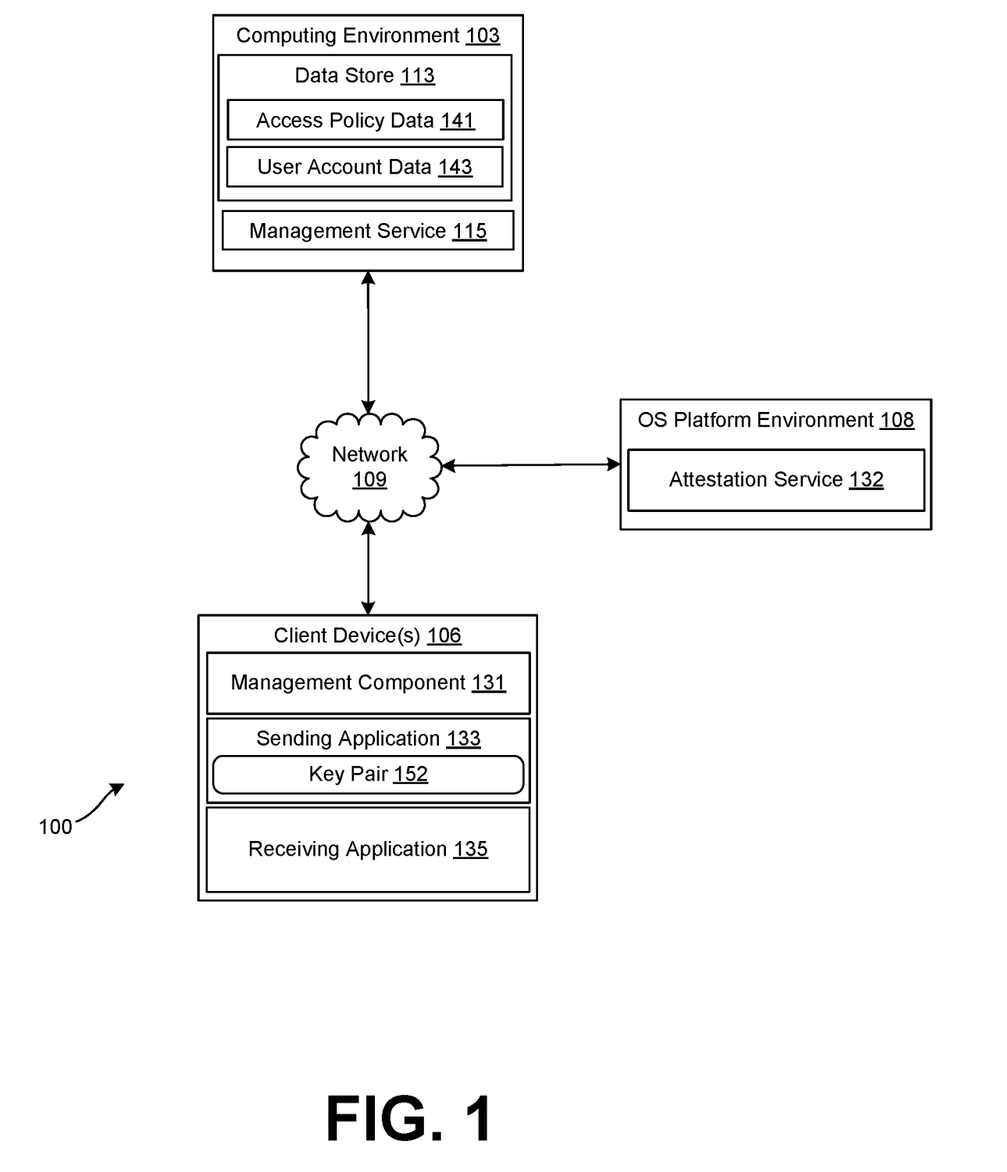
FIG. 1 is a drawing of a networked environment that includes a computing environment and one or more client devices.

With reference to FIG. 1, shown is an example of a networked environment 100. The networked environment 100 can include a computing environment 103, one or more client devices 106, an OS platform environment 108, and in communication with one another over a network 109. The network 109 can include, for example, the Internet, intranets, extranets, wide area networks (WANs), local area networks (LANs), wired networks, wireless networks, other suitable networks, or any combination of two or more such networks. For example, the networks can include wireless networks, satellite networks, cable networks, Ethernet networks, telephony networks, and other types of networks.

The computing environment 103 can include, for example, a server computer or any other system providing computing capability. Alternatively, the computing environment 103 can include a plurality of computing devices that are arranged, for example, in one or more server banks, computer banks, or other arrangements. The computing environments 103 can include a grid computing resource or any other distributed computing arrangement.

The computing devices can be located in a single installation or can be distributed among many different geographical locations. The computing environment 103 can also include or be operated as one or more virtualized computer instances. For purposes of convenience, the computing environment 103 is referred to herein in the singular, although it is understood that a plurality of computing environments 103 can be used. As the computing environment 103 communicates with the client devices 106 remotely over the network 109, the computing environment 103 can be described as a "remote" or a "cloud" computing environment 103.

The computing environment 103 can include a data store 113. The data store 113 can include memory of the computing environment 103, mass storage resources of the computing environment 103, or any other storage resources on which data can be stored by the computing environment 103. The data store 113 can include one or more databases, such as a structured query language (SQL) database, a non-SQL database, or other appropriate database. The data stored in the data store 113, for example, can be associated with the operation of the various applications or functional entities described below.

The components executed on the computing environment 103 can include, for example, the management service 115 as well as other applications, services, processes, systems, engines, or functionality not discussed in detail herein. The management service 115 can oversee the operation of client devices 106 enrolled as managed devices with the management service 115. In some embodiments, an entity, such as one or more enterprises, companies, or other organizations, can operate the management service 115 to oversee or manage the operation of the client devices 106 of its employees, contractors, customers, or other users having an account with the management service 115.

The management service 115 can install various software components on a client device 106. For example, the management service 115 can install client applications 133, resources, libraries, drivers, configuration profiles, or other components on the client device 106 as specified by an administrator of the management service 115. The management service 115 can also cause policies to be implemented on a client device 106. Policies can include restrictions or permissions pertaining to capabilities of a client device 106 that can pertain to accessing enterprise data on the client device 106.

The management service 115 can interact with one or more client applications 133 executed on the client device 106 to perform management functions. In one example, the management service 115 can interact with a management component 131 on the client device 106, which can carry out various management functions on behalf of the management service 115 on the client device. The management component 131 can be installed when the client device 106 is enrolled as a managed device with the management service 115. When enrolled, the management component 131 can be registered as a device administrator of the client device 106, which can provide the management component 131 with sufficient privileges to control the operation of the client device 106. In one example, the management component 131 can be registered as the device administrator through the installation of a management profile that causes the operating system to designate the management component 131 as the device administrator.

The management service 115 can direct the management component 131 to perform various device management functions on the client device 106. For example, the management service 115 can direct the management component 131 to control access to certain software or hardware functions available on the client device 106. As a result, the management service 115 can verify that the configuration and operation of the client device 106 conforms with predefined criteria that ensures that data on the client device 106 is protected from data loss, unauthorized access, or other harmful events.

The management service 115 can also instruct the management component 131 to install other applications that can provide other capabilities for the user. For example, an application installed on a can include a productivity application, a communication application, a security application, an SSO application, or any other application designated by a user or an administrator as necessary or useful on the device. In one scenario, the management component 131 can install applications on the device on behalf of the user. In other scenarios, a user can download and install an application on the client device 106 without intervention from the management component 131. It should be noted that it is not necessary for a client device 106 to be managed by a management service 115 according to all examples of the disclosure.

The management service 115 can communicate with applications installed on client devices 106 to validate whether an application should be granted access to requested resources. For example, an application can receive a request from another application on the client device. The receiving application can communicate with the management service 115 to validate whether the request is legitimate and/or whether the application from which the request originated is legitimate or potentially malicious.

A sending application 133 represents an application executed on the client device 106 that is sending a request to another application that is executing on the client device 106. A receiving application 135 represents an application that is receiving a request from a sending application 133 and that validates the identity of the sending application 133 according to examples of this disclosure. It should be noted that a sending application 133 can also be a receiving application 135 if the application is receiving data from another application in a different context or as a part of a different request.

A sending application 133 can request a key pair 152. A key pair 152 represents a public key and a corresponding private key according to an asymmetric cryptography framework. The key pair 152 can be requested by the sending application 133 from an operating system running on the client device 106, such as APPLE IOS. The key pair 152, or at least the private key of the key pair, can be stored in a database or private storage on the client device 106 that can be managed by the operating system. The private storage can represent a password management system, a key management system, or a secure storage area on the client device 106 that maintains the security of private keys generated by the OS.

Accordingly, the public key and the private key corresponding to the key pair 152 might be stored separately from one another on the client device 106. The sending application 133 can maintain storage of the public key, which is less sensitive than the private key, for example.

The data stored in the data store 113 can include, for example, access policy data 141 and user account data 143. In some implementations, the data store 113 can also house data that facilitates operation of the management service 115, such as device profiles, and compliance rules. User account data 143 can include information pertaining to end users of the client devices 106 enrolled with the management service 115. User account data 143 can also include information about an account within the OS platform environment 108 that is associated with a user account in the management service 115 or an enterprise directory. In other words, the user account data 143 can include a reference to a user account in the management service 115 that corresponds to a management service 115 in an enterprise directory service. User account data 143 an include data used to authenticate an end user, such as a username, password, email address, biometric data, device identifier, registry identifier, or other data.

Access policy data 141 can include data from which the management service 115 can determine whether applications should be validated or granted access to resources based upon requests that are exchanged on a client device 106. For example, a receiving application 135 can validate a request from a sending application 133 on a client device 106, but the receiving application 135 can also request that the management service 115 verify that the sending application 133 is entitled to access a requested resource. The access policy data 141 can contain data that the management service 115 can consult to determine whether a particular request for which the receiving application 135 requests verification. The access policy data 141 can specify whitelists and/or blacklists of bundle identifiers that should be granted or denied access to resources that are requested from a receiving application 135, such as an authentication token, enterprise resources, or other data.

User account data 143 can include information about user accounts in a particular enterprise. A user account can be an account in an enterprise directory service that provides for user management and access to enterprise resources such as email, documents, identity providers or single sign-on services, and other enterprise resources. Additionally, user account data 143 can include a reference, authentication token, or credentials that allow users to access third party services provided by the enterprise, such as a third-party payroll or OS platform environment 108. Another example of a third-party service can be a customer relationship management tool that federates authentication to a single sign-on service utilized by the enterprise.

The client device 106 can be representative of one or more client devices 106. The client device 106 can include a processor-based system, such as a computer system, that can include a desktop computer, a laptop computer, a personal digital assistant, a cellular telephone, a smartphone, a set-top box, a music player, a tablet computer system, a game console, an electronic book reader, or any other device with like capability. The client device 106 can also be equipped with networking capability or networking interfaces, including a localized networking or communication capability, such as a near-field communication (NFC) capability, radio-frequency identification (RFID) read or write capability, or other localized communication capability.

The client device 106 can include an operating system that runs a management component 131 and various applications. The management component 131 can be a portion of the operating system or a standalone component that manages the client device 106 on behalf of the management service 115. The management component 131 can enforce compliance rules and policies, install configuration profiles, and perform other management actions on the client device 106 on behalf of the remotely executed management service 115.

In some examples, at least a portion of the applications that can be installed on the client device 106 are "managed applications" where the management service 115 can oversee or control operation of the applications. For instance, using an administrator console, an administrator of the management service 115 can distribute, secure, and track applications installed on client devices 106 enrolled with the management service 115.

A sending application 133 according to the disclosure can be any application that incorporates the functionality described herein that provides a request to a receiving application 135 that can be validated by the receiving application 135. In some examples, a sending application 133 and receiving application 135 can be created using a particular SDK that implements the validation processes discussed in this disclosure.

In one example, one or more libraries provided by the SDK can incorporate functionality that implements the tasks of obtaining an attestation payload and utilizing the attestation payload in an inter-app communication with a receiving application 135 Additionally, SDK libraries can also perform the tasks of verifying a request containing an attestation payload. However, a receiving application 135 and/or sending application 133 can also be instrumented to perform these tasks on their own without incorporating one or more SDK libraries.

The sending application 133 can be instrumented to invoke the functionality of an SDK library by more one or more API calls to the SDK library. The API calls can allow the sending application 133 to generate a key pair 152, requesting an attestation payload, and transmit a request to a receiving application 135 that incorporates the attestation payload. In a receiving application 135, the application can invoke the functionality of an SDK library by making API calls to the SDK library. The SDK library can perform the task of validating the identity of a sending application 133 based upon an attestation payload that is included with a request from the sending application 133.

The OS platform environment 108 can include, for example, a server computer or any other system providing computing capability. Alternatively, the OS platform environment 108 can include a plurality of computing devices that are arranged, for example, in one or more server banks, computer banks, or other arrangements. The OS platform environment 108 can include a grid computing resource or any other distributed computing arrangement.

The OS platform environment 108 can be a third-party system or a system managed by a operating system vendor for an operating system running on a client device 106. The OS platform environment 108 can also represent a system provided by a platform vendor utilized by the client device 106. In some examples, the OS platform environment 108 can be a third party system that provides an attestation framework that can be utilized by examples of the disclosure to validate the identity of applications.

The OS platform environment 108 can execute an attestation service 132. The attestation service 132 can represent a service that can ensure that requests to a server are originating from legitimate instances of a particular application. The attestation service 132 can operate by receiving a public key from a sending application 133 that was generated utilizing the OS running on the client device 106. The public key corresponds to a key pair 152. The key pair 152 represents a unique, hardware-based, cryptographic key pair. The attestation service 132 can provide an attestation payload in response to receiving a request from a sending application 133. The attestation payload can incorporate a hash value that is based upon the identity of the application, a bundle identifier, an application identifier, or other identifier that identifies the sending application 133. The attestation payload is also signed using a private key associated with the OS platform environment 108. A receiving application 135 can validate the payload because it is signed and can also validate the hash value, thereby validating the identity of the application.

The attestation service 132 provided by the OS platform provider is typically utilized to validate whether requests received to a developer's server over the network 109 are legitimately sent by an application. The attestation service 132 and attestation payloads are not typically utilized to secure inter-app communications on the client device 106. Accordingly, examples of the disclosure provide a unique application of the attestation payload generated by the attestation service 132.

The attestation payload is generated based on the Web Authentication specification and can be provided in a concise binary object representation (CBOR) format. The attestation payload generated by the attestation service 132 can include an attestation object, which can include authentication data. The authentication data can include a hash of an application identifier of an application that is requesting the attestation payload. The authentication data can also include a credential identifier, which is a hash of the public key of the key pair 152.

The attestation payload can further be signed by an attestation certificate. An attestation certificate can comprise, for example, a root certificate of an OS platform vendor or a party that operates the attestation service 132. An attestation certificate can also comprise a private key associated with the attestation service 132. The signed attestation payload can be validated by a receiving application 135 to verify that the attestation payload was generated by the attestation service 132.

Figure 2:
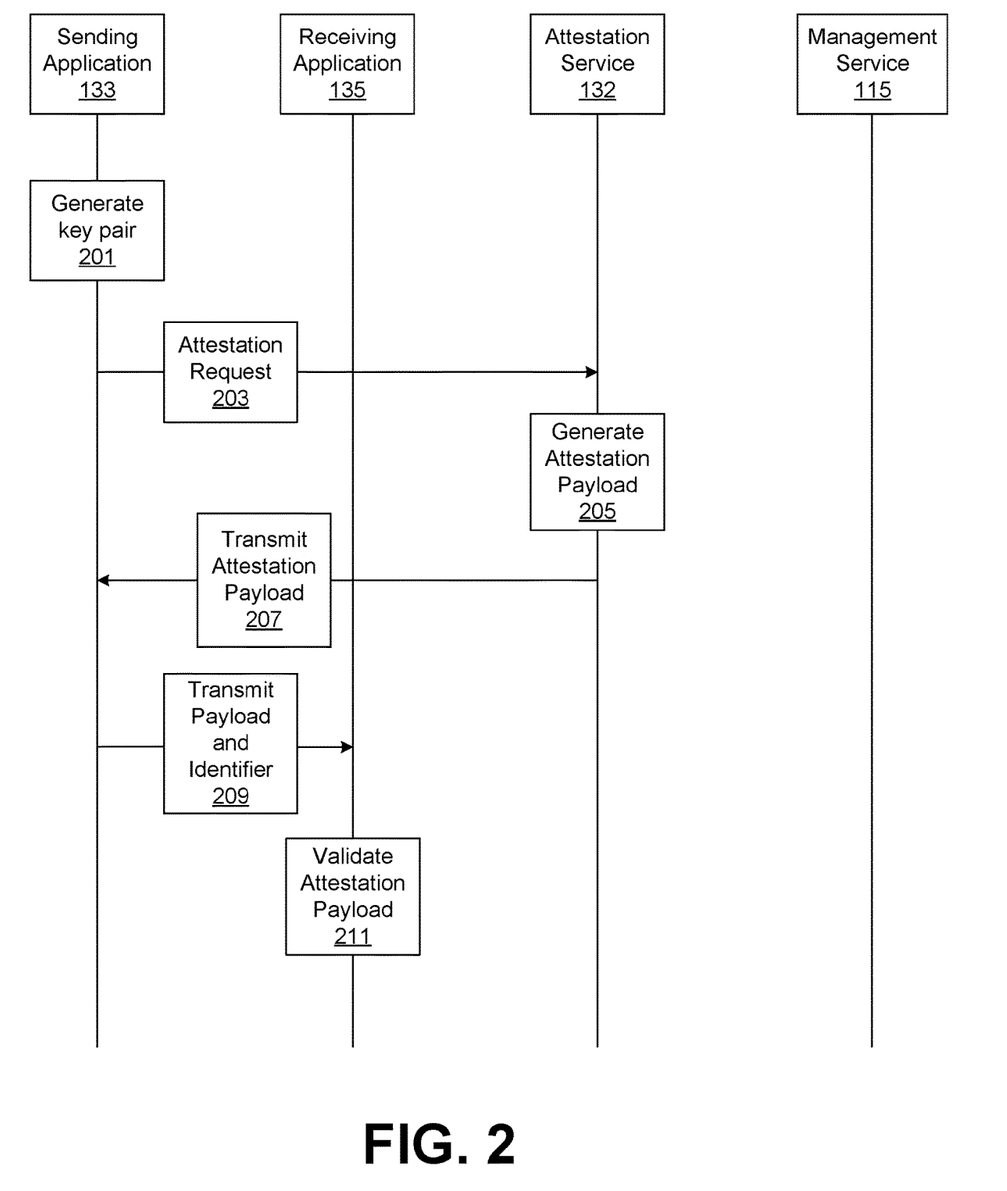
FIG. 2 is a sequence diagram illustrating functionality implemented by components of the networked environment.

Referring next to FIG. 2, shown is an example communication flow according to examples of the disclosure. The sending application 133 and the receiving application 135 can be instrumented to communicate using an inter-application communication protocol. In one example, the inter-app communication protocol can rely upon OpenURL to exchange information using uniform resource locators to exchange information between applications.

As shown in the example of FIG. 2, the sending application 133 can generate a key pair 152 at step 201. The key pair 152 can be generated by requesting a key pair 152 using an operating system API call. The operating system of the client device 106 can generate a key pair 152 that is a unique, hardware-based, cryptographic key that is unique to the device or in some cases, unique to the instance of the sending application 133 that is requesting the key pair 152. In some scenarios, the key pair 152 can be unique to a user account on the client device 106 with which the user is signed in. The key pair 152 can comprise an asymmetric a public key and a private key. In some examples, the key pair 152 need not be generated each time the sending application 133 communicates with a receiving application 135. In some examples, the key pair 152 can be generated a single time and then stored on the client device 106 for later use in subsequent requests to obtain an attestation payload from the attestation service 132.

At step 203, the sending application 133 can send a request for an attestation payload to the attestation service 132. The request for the attestation payload can include the public key from the key pair 152. The request for the attestation payload can also include an identity of the sending application 133, such as a bundle identifier or application identifier. However, in some implementations, the request can exclude an identity of the sending application 133 because the application identity can be determined by the attestation service 132 based upon information in the public key or because the attestation service 132 can receive information about the sending application 133 that requested the creation of the key pair 152 from the operating system of the client device 106.

At step 205, the attestation service 132 can generate an attestation payload for the sending application 133. The attestation payload can include various fields, such as authentication data. The authentication data can include a hash of the application identifier or of multiple application identifiers that identify the sending application 133. For example, the hash value can be based upon a bundle identifier and a team identifier associated with the sending application 133. The hash value can be referred to as an RP ID hash in some examples. The RP ID, for example, can comprise a hash of the application identifier of the sending application 133, which can be a concatenation of a 10-digit team identifier, a period, and a bundle identifier of the sending application 133.

The attestation payload can further include an attestation statement according to the Web Authentication specification. The attestation payload can further be signed by one or more certificates or private keys associated with the attestation service 132 or an OS platform provider.

At step 207, the attestation service 132 can transmit the attestation payload to the sending application 133 over the network 109. Again, in examples of the disclosure, the attestation service 132 can be executed remotely from the client device 106, such as on one or more servers provided by the OS platform provider. The attestation payload can be included as a parameter in an OpenURL request, or as a parameter in a uniform resource locator, that is provided to the receiving application 135.

At step 209, the sending application 133, once the attestation payload is obtained from the 132, can communicate with a receiving application 135. For example, the sending application 133 can comprise an email client and the receiving application 135 can comprise an SSO application from which the sending application 133 is requesting an authentication token to be provided to an email server. Accordingly, the sending application 133 can send a request for the authentication token to the receiving application 135 using one or more OpenURL requests. The requests can include information identifying a user, for example. Additionally, one or more of the transmissions to the receiving application 135 can include the attestation payload, or a portion thereof. Additionally, the request sent to the receiving application 135 from the sending application 133 can further include the bundle identifier and/or team identifier of the sending application 133.

In some implementations, the request to the receiving application 135 can include a payload that is signed. For example, an OpenURL protocol in a 3rd party application involves generating an in-memory RSA key pair and passing the public key in the OpenURL request to the receiving application 135 so that it can encrypt the credentials using the public key. When the 3rd party receives the response back, the response can be decrypted using its private key. Accordingly, when the complete OpenURL request is signed by the operating system API, which uses the private key from the key pair 152, a potentially malicious application cannot replace the 3rd party application's provided public key. In this way, an attacker can only get access to the encrypted credentials but will not be able to decrypt them.

In some examples, the payload of the request to the receiving application 135 can also include a system uptime parameter or uptime counter that can be obtained from the operating system of the client device 106. Including the system uptime of the client device 106 can reduce the chances of malicious applications executed on a different device from performing a replay attack to obtain content from the receiving application 135 by masquerading as the sending application 133. In some examples, other than a system uptime parameter, any other device secret that is obtained from the operating system and that cannot be obtained, or easily obtained, by a device other than the client device 106.

At step 211, the receiving application 135 can validate the request from the sending application 133. The receiving application 135 can validate the request by verifying the identity of the sending application 133. The identity of the sending application 133 can be verified by checking that the hash value of the application identifier(s) in the attestation payload matches an expected value. By verifying the identity of the sending application 133, the receiving application 135 can validate that a potentially malicious application other than the sending application 133 is not attempting to masquerade as the sending application 133 to obtain potentially sensitive information from the receiving application 135.

The receiving application 135 can also validate the request that verifying that the attestation payload is signed by a certificate or private key associated with the attestation service 132. The receiving application 135 can perform this validation by obtaining a root certificate of the attestation service 132 or OS platform provider that is publicly available.

Additionally, the receiving application 135, once the identity of the sending application 133 is validated, can also verify with the management service 115 that the access policy data 141 indicates that the sending application 133 is entitled to access the requested information, token, or other data from the receiving application 135. If the identity of the sending application 133 is validated and if the request is validated with the management service 115, the receiving application 135 can provide the requested data. In some implementations, the receiving application 135 may not separate validate the request with the management service 115 and may instead rely on validating the attestation payload along with other parameters included in the request from the sending application 133.

Figure 3:
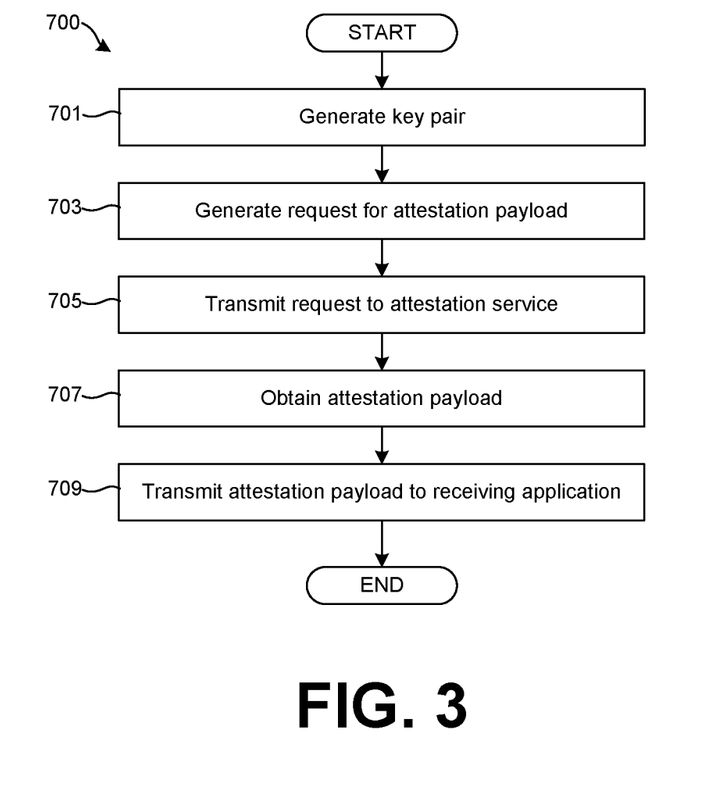
FIG. 3 is a flowchart illustrating functionality implemented by components of the networked environment.

Referring next to FIG. 3, shown is a flowchart 700 that provides one example of the operation of a portion of the client device 106. The flowchart 700 can be viewed as depicting an example of elements of a method implemented by the sending application 133 according to various embodiments of the disclosure. The separation or segmentation of functionality as discussed herein is presented for illustrative purposes only.

At step 701, the sending application 133 can generate a key pair 152. The key pair 152 can be generated by requesting a key pair 152 using an operating system API call. The operating system of the client device 106 can generate a key pair 152 that is a unique, hardware-based, cryptographic key that is unique to the device or in some cases, unique to the instance of the sending application 133 that is requesting the key pair 152. In some scenarios, the key pair 152 can be unique to a user account on the client device 106 with which the user is signed in. The key pair 152 can comprise an asymmetric a public key and a private key. In some examples, the key pair 152 need not be generated each time the sending application 133 communicates with a receiving application 135. In some examples, the key pair 152 can be generated a single time and then stored on the client device 106 for later use in subsequent requests to obtain an attestation payload from the attestation service 132.

At step 703, the sending application 133 can generate a request for an attestation payload. The request for the attestation payload can include the public key from the key pair 152. The request for the attestation payload can also include an identity of the sending application 133, such as a bundle identifier or application identifier. However, in some implementations, the request can exclude an identity of the sending application 133 because the application identity can be determined by the attestation service 132 based upon information in the public key or because the attestation service 132 can receive information about the sending application 133 that requested the creation of the key pair 152 from the operating system of the client device 106.

At step 705, the sending application 133 can send the request for the attestation payload to the attestation service 132. The request can be sent over the network 109 because the attestation service 132 is executed remotely from the client device 106.

At step 707, the sending application 133 can obtain the attestation payload from the attestation service 132. The attestation payload can include various fields, such as authentication data. The authentication data can include a hash of the application identifier or of multiple application identifiers that identify the sending application 133. For example, the hash value can be based upon a bundle identifier and a team identifier associated with the sending application 133. The hash value can be referred to as an RP ID hash in some examples. The RP ID, for example, can comprise a hash of the application identifier of the sending application 133, which can be a concatenation of a 10-digit team identifier, a period, and a bundle identifier of the sending application 133.

The attestation payload can further include an attestation statement according to the Web Authentication specification. The attestation payload can further be signed by one or more certificates or private keys associated with the attestation service 132 or an OS platform provider.

At step 709, the sending application 133 can transmit the attestation payload to the receiving application 135. For example, the sending application 133 can comprise an email client and the receiving application 135 can comprise an SSO application from which the sending application 133 is requesting an authentication token to be provided to an email server. Accordingly, the sending application 133 can send a request for the authentication token to the receiving application 135 using one or more OpenURL requests. The requests can include information identifying a user, for example. Additionally, one or more of the transmissions to the receiving application 135 can include the attestation payload, or a portion thereof. Additionally, the request sent to the receiving application 135 from the sending application 133 can further include the bundle identifier and/or team identifier of the sending application 133.

As noted above, in some implementations, the request to the receiving application 135 can include a payload that is signed. In some examples, the payload of the request to the receiving application 135 can also include a system uptime parameter that can be obtained from the operating system of the client device 106. Including the system uptime of the client device 106 can reduce the chances of malicious applications executed on a different device from performing a replay attack to obtain content from the receiving application 135 by masquerading as the sending application 133. Thereafter, the process can proceed to completion.

Figure 4:
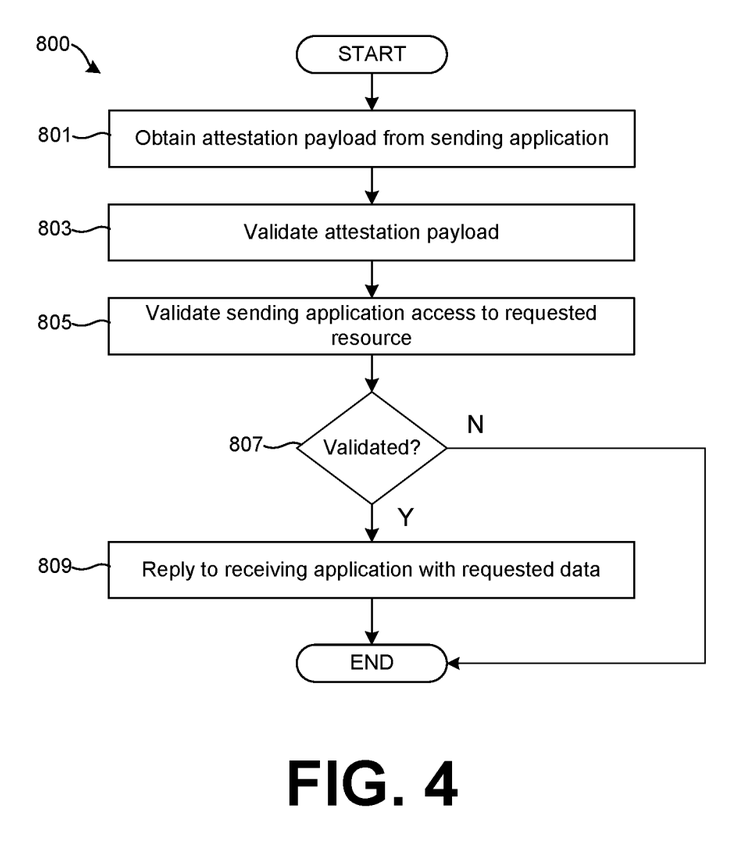
FIG. 4 is a flowchart illustrating functionality implemented by components of the networked environment.

Referring next to FIG. 4, shown is a flowchart 800 that provides one example of the how a receiving application 135 can receive a request incorporating an attestation payload from the sending application 133 and validate the attestation payload. The flowchart of FIG. 8 can be viewed as depicting an example of elements of a method implemented by receiving application 135. The separation or segmentation of functionality as discussed herein is presented for illustrative purposes only.

In step 801, the receiving application 135 can obtain an attestation payload from a sending application 133. The attestation payload can be included in an OpenURL request from the sending application 133. For example, the attestation payload can comprise a parameter of a URL or an OpenURL request.

At step 803, the receiving application 135 can validate the attestation payload. The receiving application 135 can validate the attestation payload, and doing so verifies identity of the sending application 133. The identity of the sending application 133 can be verified by checking that the hash value of the application identifier(s) in the attestation payload matches an expected value. By verifying the identity of the sending application 133, the receiving application 135 can validate that a potentially malicious application other than the sending application 133 is not attempting to masquerade as the sending application 133 to obtain potentially sensitive information from the receiving application 135.

The receiving application 135 can also validate the request that verifying that the attestation payload is signed by a certificate or private key associated with the attestation service 132. The receiving application 135 can perform this validation by obtaining a root certificate of the attestation service 132 or OS platform provider that is publicly available.

At step 805, the receiving application 135 can validate that the sending application sending application 133, once the identity of the sending application 133 is validated in step 803, is entitled to access the resource requested by the sending application 133 in the request received in step 801. The receiving application 135 can verify with the management service 115 that the access policy data 141 indicates that the sending application 133 is entitled to access the requested information, token, or other data from the receiving application 135. In some implementations, the receiving application 135 may not separate validate the request with the management service 115 and may instead rely on validating the attestation payload along with other parameters included in the request from the sending application 133.

At step 807, the receiving application 135 can determine whether the identity of the sending application 133 is validated and whether the sending application 133 is entitled to access the requested resource. If the identity of the sending application 133 is validated and if the request is validated by the management service 115, the receiving application 135 can proceed to step 809. If the identity of the sending application 133 is not validated or if the request is not validated by the management service 115, the receiving application 135 can proceed to completion.

At step 809, the receiving application 135 can provide the requested resource to the sending application 133 because the identity of the sending application 133 is validated and the request is validated by the management service 115. For example, the receiving application 135 can comprise an SSO application that can provide an authentication token to an email client that can in turn provide to an email server executed remotely from the device. Thereafter, the process proceeds to completion.

The client devices 106 or devices making up the computing environment 103 can include at least one processor circuit, for example, having a processor and at least one memory device, both of which are coupled to a local interface, respectively. The device can include, for example, at least one computer, a mobile device, smartphone, computing device, or like device. The local interface can include, for example, a data bus with an accompanying address/control bus or other bus structure.

Stored in the memory device are both data and several components that are executable by the processor. In particular, stored in the one or more memory devices and executable by the device processor can be the sending application 133, receiving application 135, and potentially other applications. Also stored in the memory can be a data store 113 and other data.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Although the management service 115, the sending application 133, receiving application 135, and other various systems described herein can be embodied in software or code executed by general-purpose hardware as discussed above, as an alternative, the same can also be embodied in dedicated hardware or a combination of software/general purpose hardware and dedicated hardware.

Although the sequence diagram flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

It is emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system, comprising:
a client device comprising at least one processor; and
a sending application executable by the client device that, when executed, direct the client device to at least:
generate a key pair comprising a public key and a private key;
transmit a request for an attestation payload from an attestation service executed remotely from the client device, the request for the attestation payload comprising the public key or an identifier corresponding to the public key;
obtain the attestation payload from the attestation service, the attestation payload comprising an identifier identifying the sending application; and
provide the attestation payload to a receiving application executed on the client device, wherein the receiving application validates an identity of the sending application based upon the attestation payload obtained from the attestation service.

2. The system of claim 1, wherein the attestation payload comprises a hash value based upon an application identifier associated with the sending application.

3. The system of claim 1, wherein the attestation payload is signed using an attestation certificate associated with an operating system platform provider that is verifiable by the receiving application.

4. The system of claim 1, wherein the sending application provides the attestation payload in an OpenURL request generated by the sending application, wherein the attestation payload is provided as a parameter to the OpenURL request.

5. The system of claim 4, wherein the OpenURL request is signed by the private key of the sending application.

6. The system of claim 4, wherein the OpenURL request further comprises a device secret, wherein the device secret comprises an uptime counter obtained from an operating system of the client device.

7. The system of claim 1, wherein the receiving application provides a token in response to validating the identity of the sending application.

8. A non-transitory computer-readable medium embodying instructions executed by a client device, the instructions, when executed, causing the client device to at least:
generate a key pair comprising a public key and a private key;
transmit a request for an attestation payload from an attestation service executed remotely from the client device, the request for the attestation payload comprising the public key or an identifier corresponding to the public key;
obtain the attestation payload from the attestation service, the attestation payload comprising an identifier identifying a sending application; and
provide the attestation payload to a receiving application executed on the client device, wherein the receiving application validates an identity of the sending application based upon the attestation payload obtained from the attestation service.

9. The non-transitory computer-readable medium of claim 8, wherein the attestation payload comprises a hash value based upon an application identifier associated with the sending application.

10. The non-transitory computer-readable medium of claim 8, wherein the attestation payload is signed using an attestation certificate associated with an operating system platform provider that is verifiable by the receiving application.

11. The non-transitory computer-readable medium of claim 8, wherein the instructions provide the attestation payload in an OpenURL request generated by the sending application, wherein the attestation payload is provided as a parameter to the OpenURL request.

12. The non-transitory computer-readable medium of claim 11, wherein the OpenURL request is signed by the private key of the sending application.

13. The non-transitory computer-readable medium of claim 11, wherein the OpenURL request further comprises a device secret, wherein the device secret comprises an uptime counter obtained from an operating system of the client device.

14. The non-transitory computer-readable medium of claim 8, wherein the receiving application provides a token in response to validating the identity of the sending application.

15. A method, comprising:
generating, on a client device, a key pair comprising a public key and a private key;
transmitting, on the client device, a request for an attestation payload from an attestation service executed remotely from the client device, the request for the attestation payload comprising the public key or an identifier corresponding to the public key;
obtaining, on the client device, the attestation payload from the attestation service, the attestation payload comprising an identifier identifying a sending application; and
providing, on the client device, the attestation payload to a receiving application executed on the client device, wherein the receiving application validates an identity of the sending application based upon the attestation payload obtained from the attestation service.

16. The method of claim 15, wherein the attestation payload comprises a hash value based upon an application identifier associated with the sending application.

17. The method of claim 15, wherein the attestation payload is signed using an attestation certificate associated with an operating system platform provider that is verifiable by the receiving application.

18. The method of claim 15, further comprising providing, on the client device, the attestation payload in an OpenURL request generated by the sending application, wherein the attestation payload is provided as a parameter to the OpenURL request.

19. The method of claim 18, wherein the OpenURL request is signed by the private key of the sending application.

20. The method of claim 18, wherein the OpenURL request further comprises a device secret, wherein the device secret comprises an uptime counter obtained from an operating system of the client device.

* * * * *